(No Model.) 2 Sheets—Sheet 1.
W. J. & C. J. LOMAX.
METHOD OF AND MEANS FOR EFFECTING FILTRATION OF LIQUIDS.
No. 560,512. Patented May 19, 1896.
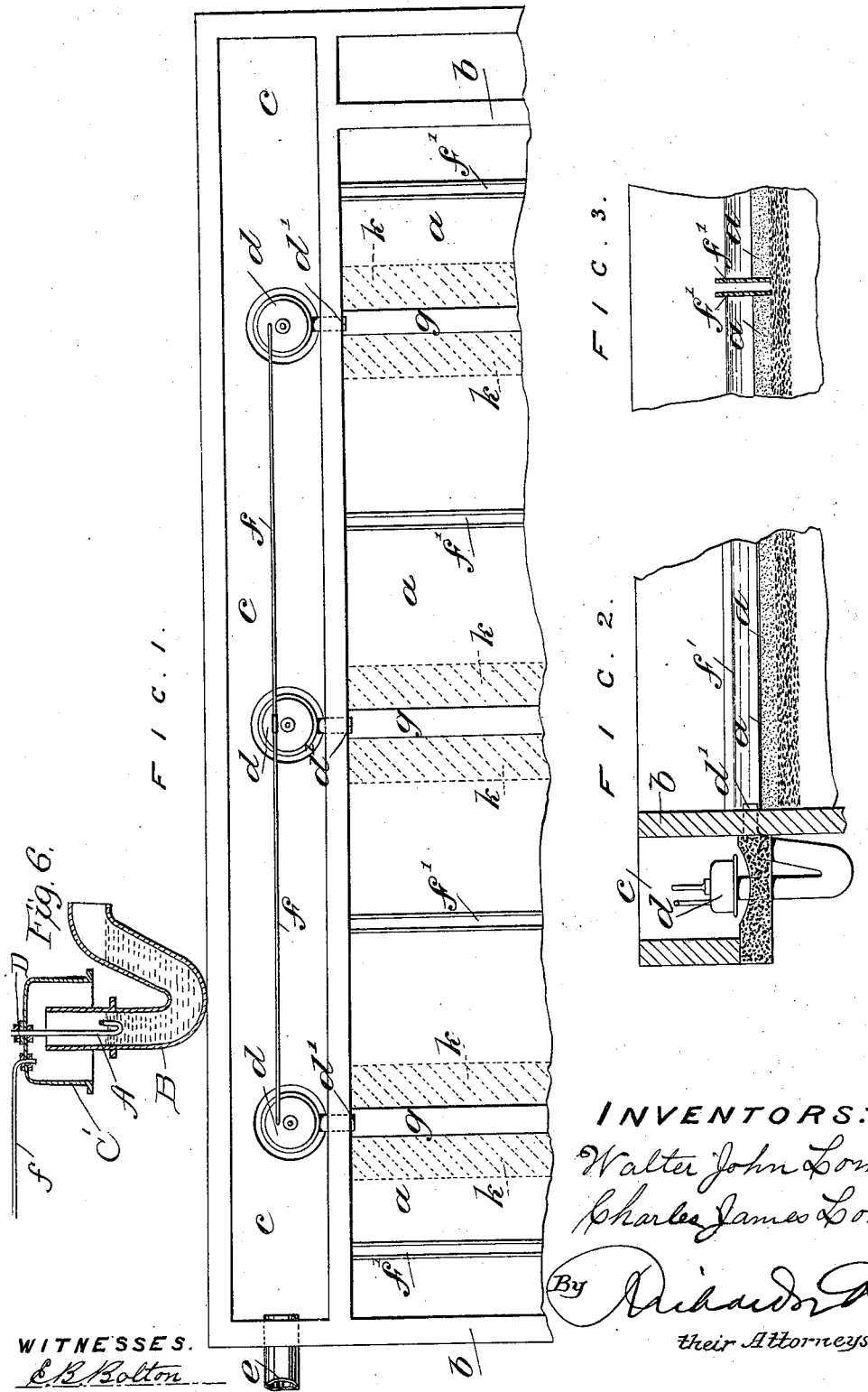
WITNESSES.
E. B. Bolton
H. van Oldenneel
INVENTORS:
Walter John Lomax
Charles James Lomax
By 
their Attorneys.

(No Model.) 2 Sheets—Sheet 2.
W. J. & C. J. LOMAX.
METHOD OF AND MEANS FOR EFFECTING FILTRATION OF LIQUIDS.
No. 560,512. Patented May 19, 1896.
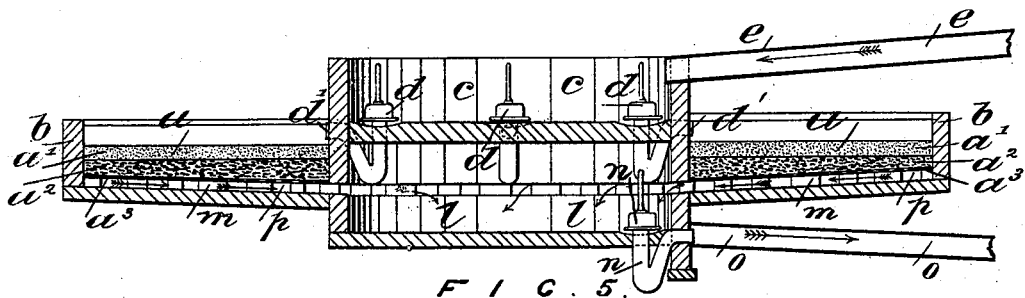
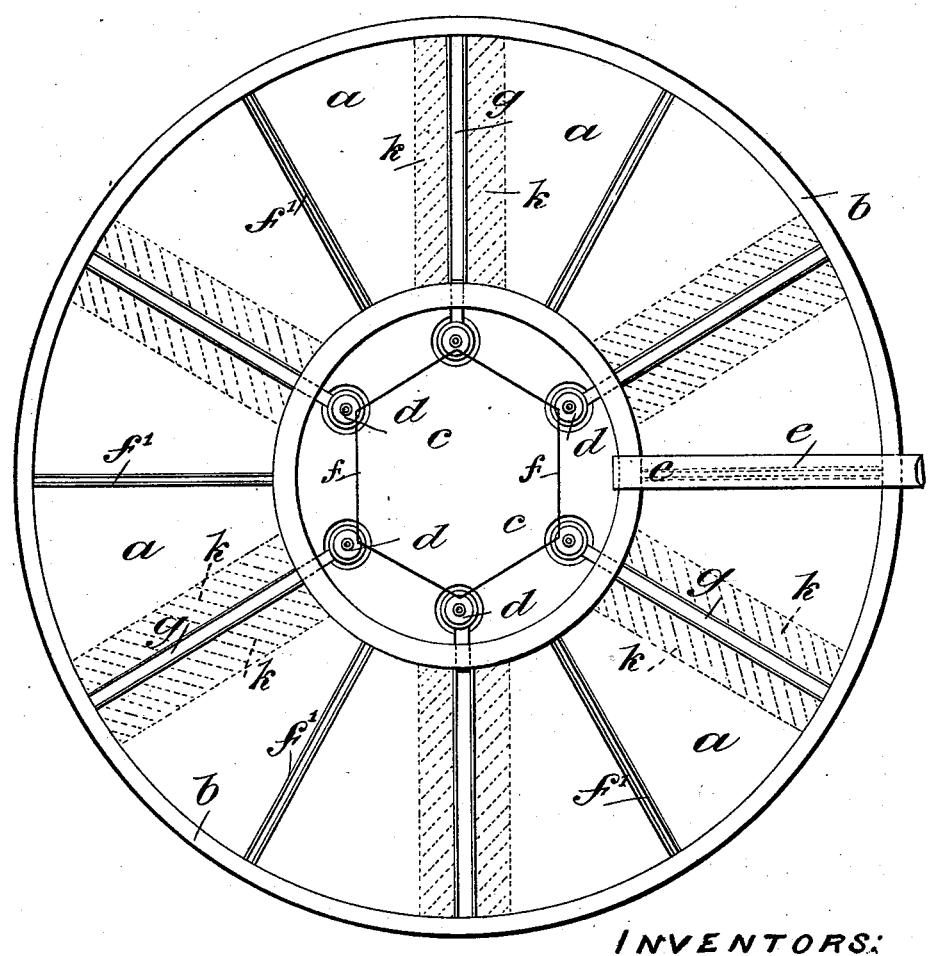
WITNESSES.
E. B. Bolton
H. van Oldenneel
INVENTORS:
Walter John Lomax
Charles James Lomax
By Richardson
their Attorneys

UNITED STATES PATENT OFFICE.

WALTER JOHN LOMAX AND CHARLES JAMES LOMAX, OF BOLTON, ENGLAND.

METHOD OF AND MEANS FOR EFFECTING FILTRATION OF LIQUIDS.

SPECIFICATION forming part of Letters Patent No. 560,512, dated May 19, 1896.

Application filed October 14, 1895. Serial No. 565,564. (No model.) Patented in England October 17, 1894, No. 19,761.

*To all whom it may concern:*

Be it known that we, WALTER JOHN LOMAX and CHARLES JAMES LOMAX, surveyors, subjects of the Queen of Great Britain and Ireland, residing at 11 Fold Street, Bolton, in the county of Lancaster, England, have invented certain new and useful Improvements in the Method of and Means for Effecting the Filtration of Liquids, of which the following is a specification, and for which we have obtained Letters Patent in Great Britain, No. 19,761, dated October 17, 1894.

Our said invention refers to improved means and arrangements for effecting the filtration of sewage and other impure waters and liquids. Where an ordinary filter-bed is used, continually covered with liquid, the filtering materials lose a great part of their efficiency by becoming deoxygenated or robbed of the air that at first permeated the materials and assisted their action. This fact has been for some time recognized by filtering authorities.

The object of our invention is to provide for repeated and regular automatic aeration or oxygenation of the filter-bed, and this we do by automatically flooding the filter-bed at regular intervals, allowing the liquid to sink through the materials and leave the filter-bed exposed to the air, which again permeates the materials and reaerates or reoxygenates them.

Under a modified form of our invention we cause air to pass through the filter-bed in both directions, thus setting up, as it were, a breathing action of inspiration and expiration through the filtering materials, which still more effectually aerates the same.

The invention will be most easily understood by a reference to the annexed two sheets of illustrative drawings.

On Sheet 1, Figure 1 is a plan view of a simple arrangement of our improved automatically aerated or oxygenated filter-bed. Fig. 2 is a vertical cross-section of the same. Fig. 3 illustrates in section certain ventilating-boards we place in the filter-bed to conduct away air, which would otherwise have to bubble up through the water. On Sheet 2, Fig. 4 is a vertical cross-section of the modified form of filter-bed, in which the air is caused to traverse the filter-bed in both directions. Fig. 5 is a plan view of Fig. 4. Fig. 6 is a sectional view of one of the siphons.

Referring in the first place to Figs. 1 to 3, the filter-bed $a$ is inclosed within walls $b$ of sufficient height. At one end of the filter-bed $a$ is a tank or flushing-chamber $c$, occupied by three siphons $d\ d\ d$. The sewage or other liquid to be filtered is led to the tank $c$ by a pipe $e$. The siphons $d$ are connected by an air-pipe $f$, so as to cause them all to act simultaneously. The outlets $d'\ d'\ d'$ of the siphons $d$ discharge into the filter-bed inclosure $a$, or rather into troughs $g\ g\ g$, extending the length of the filter-bed $a$. These troughs are sunk in the filter-bed, the top of each trough lying flush with the level of the filter-bed. The object of the troughs is to prevent the water as it is discharged from the siphons from pouring down directly upon the surface of the filter-bed and disturbing it. Instead of this the water runs into the troughs $g$, fills them, and then overflows over the edges of the trough and over the surface of the filter-bed $a$. Lest even the overflowing over the edges of the troughs should have a disturbing influence upon the adjacent parts of the filter-surface (which is usually composed of sand) we use the additional precaution of covering the portions of the filter-bed surface extending alongside of the troughs with netting or wire-gauze or wickerwork or pervious canvas, (represented in Fig. 1 by the diagonal dotted lines $k$,) or other thin pervious fabric or perforated material which will prevent the sand from being disturbed by the overflowing liquid from the troughs. The body of the filter-bed $a$ may be composed of layers of any suitable material, and the sand or other finer substance composing the surface may be covered wholly or in part with spar gravel, stone-chippings, canvas, fibrous materials, wickerwork, netting, wire-gauze, perforated plates, or the like. The sand surface may be from six to nine inches in thickness, while beneath we might have about twelve inches of oxidizing material, such as "polarite" or magnetic oxid of iron. The lower layer may be supported on a pervious bottom of wickerwork, perforated material, or the like, and the several layers might be separated by wickerwork or other pervious dividers. Let it be, however, understood that the mere construction or composition of the filter-bed forms no part of our invention.

We may now describe the action of our improved filtering arrangement. The sewage or other liquid to be filtered is run by the pipe $e$ or other suitable conduit into the tank $c$. When the level of liquid in the tank $c$ has risen to such a height as to put in action the siphons $d$, (this action being caused to be simultaneous in all of the siphons by the connecting-pipe $f$,) the liquid in the tank $c$ is discharged through the outlets $d'$ of the siphons into the troughs $g$, from which it overflows upon the surface of the filter-bed. The liquid now sinks down through the filter-bed and finds its way to the outflow. In sinking through the filter-bed the liquid displaces the air in the materials and as this air tends to rise it is apt to pit or disturb the sand surface of the filter-bed and to cause bubbles on the liquid. To prevent this we provide ventilating means for allowing the air to escape without passing through the water. The said ventilating means consist of two boards $f'$, set side by side with a space between, as shown in section at Fig. 3. These boards are set on edge through the sand surface, so as to rest on the polarite or coarser material beneath. Therefore when the air is displaced by the descending liquid it passes through the polarite to the points of least resistance—viz., to the spaces between the said boards $f'$—where it escapes. As indicated in Fig. 3, the boards $f'$ stand high enough above the sand surface to overtop the water on the filter-bed surface. Thus the water has no access between the boards. As shown in Fig. 1, several of these board ventilators are disposed in the filter-bed. The discharge from the siphons ceases when the tank $c$ is empty, whereupon the siphons cease to act and the tank commences to refill. Meanwhile all of the water discharged upon the filter-bed sinks through and leaves the filter-bed again exposed to the influence of the atmosphere, whereby the filter-bed becomes reoxygenated or aerated before the next flushing takes place. Thus the filter-bed is submitted automatically to the beneficial effects of the atmosphere between each flushing. Although we have referred to the instruments for bringing about this periodic flushing of the filter-bed as "siphons," it must be understood that these automatic flushing appliances might be of any other suitable nature. For example, they might be automatic tipping vessels or valves. The mere special means employed do not affect our invention. We do not even confine ourselves to automatic means, because we might in some cases flush the filter-bed from time to time manually so long as the filter-bed is left uncovered between each flush, so as to allow it to become reoxygenated.

We may now refer to the modification of our invention shown in Figs. 4 and 5 of the drawings. Here we make the inclosed filter-bed $a$ preferably circular in form and in the center we place the flushing-tank $c$, also of a circular shape. Within the flushing-tank $c$ we place several siphons $d$ or we might have one central siphon. The sewage or other liquid to be filtered is run into the flushing-tank continuously through the conduit $e$, and when the liquid reaches a certain level in the tank the siphons act automatically, so as to discharge the contents of the tank through the outlets $d'$ into the troughs $g$, whence the liquid overflows upon the filter-bed. The portions of the filter-bed bordering upon the overflow-troughs are covered with strips $k$ of canvas or other permeable material, just as in the case of Fig. 1, to prevent disturbance of the surface at these points. The filter-bed is also furnished with ventilating-boards $f'$, by which the air rising through the bed is allowed to escape, as already described with reference to the foregoing figures. The filter-bed is composed, as in the former instance, of a surface of sand $a'$ and beneath the same a layer $a^2$ of polarite or other suitable material, but preferably a magnetic oxid of iron. The lower layer rests upon a bottom of wickerwork $a^3$ or other perforated or pervious supporting-skin. Beneath the bottom $a^3$ is an annular space $m$, sloping toward the center and discharging into a chamber $l$ beneath the flushing-tank $c$, as clearly appears in the sectional view, Fig. 4. Bricks or supports $p$ serve to carry the wickerwork bottom and filtering materials above. The liquid which is discharged upon the filter-bed $a$ from the central tank $c$ sinks through the filtering materials into the sloping annular space $m$, from which it runs into the lower central chamber $l$, the upper part of which constitutes an air-space. In this chamber $l$ there is also a siphon or siphons $n$, so that when the liquid in the chamber $l$ reaches a fixed level the contents of the chamber $l$ are in turn automatically discharged by the siphon or siphons $n$ into the conduit $o$, by which the filtered liquid is led away to the outflow. The reasons for this double arrangement are as follows: In the first place the liquid discharged at intervals from the upper flushing-tank $c$ upon the filter-bed sinks down through the filter-bed, displacing the air therein and drawing air after it. As it permeates through the filter-bed and fills the lower chamber $l$, the air in the upper part of the said chamber is expelled by the rising level of the liquid in the chamber $l$ and is practically forced upward through the filter-bed. Thus there is expiration of air upward and through the filter-bed. The liquid having now permeated through the filter-bed and filled the lower chamber $l$ to the required level the siphon $n$ comes into action and the water in the lower chamber is suddenly discharged to the outflow $o$. This sudden withdrawal of the liquid contents of the chamber $l$ creates a partial vacuum therein and causes air to be drawn inward and downward through the filter-bed to supply the place of the discharged liquid. Thus there is inspiration of air downward through the filter. In other words, by the automatic action hereinbefore described the air is regularly expired and inspired through the filter, which may be thus said to breathe. The said up and down currents of air have the effect of more thoroughly oxygenating or aerating the filter-bed than the simpler method shown in Figs. 1 and 2, but either method carries the true spirit of our invention into effect.

The form of siphon employed by us is shown in Fig. 6. We do not wish to be limited to this form. The siphon acts as follows: The smallest V-trap A in the leg B is shorter than the trap formed by the siphon proper. The water rising in the tank locks air in the dome $C'$ and leg B. Compression now begins, forcing the water in the short trap up the tube D. When the water has risen sufficiently high in the tank to break the trap A, the air is released in the dome $C'$ and through the pipe $f$ in the next siphon, to which it is connected, and siphonic action is set up and tanks discharged. The trap A is remade by the water falling through B during the operation.

We claim as our invention—

1. In combination, in a filter, the filter-bed, a flushing tank or chamber, the partition-wall between them, and a siphon $d$ connecting the flushing-tank with the filter-bed by which the flushing-tank will be emptied periodically when the water in the flushing-tank reaches a certain height, substantially as described.

2. In combination, the filter-beds, the troughs $g$ extending through said beds, means for supplying said troughs, and the fenders or shields along the edges of the troughs and between the same and the material of the filter-beds, substantially as described.

3. In combination, the flushing-tank $c$ and the central chamber $d$ below the same, the annular filter-bed about the tank $c$, siphon connections between said tank and the filter-bed, said filter-bed having an annular space beneath it communicating with the chamber $d$ and the outlet-siphon from the chamber $d$ substantially as described.

4. In combination, the superimposed chambers $c$ and $d$ and the annular filter-bed about the same, the siphon connections between the chamber $c$ and the annular filter-bed, said filter-bed communicating with the chamber $d$, and the outlet-siphon from the chamber $d$, substantially as described.

In witness whereof we have hereunto set our hands in presence of two witnesses.

WALTER JOHN LOMAX.
CHARLES JAMES LOMAX.

Witnesses:
JOSHUA ENTWISLE,
RICHARD IBBERSON.